United States Patent
Burkatovsky et al.

(10) Patent No.: US 8,154,808 B2
(45) Date of Patent: Apr. 10, 2012

(54) AUTOFOCUS IMAGING APPARATUS

(75) Inventors: Vitaly Burkatovsky, Rishon Le Zion (IL); David Aviel, Tel Mond (IL)

(73) Assignee: Eastman Kodak Company, Rochester, NY (US)

(*) Notice: Subject to any disclaimer, the term of this patent is extended or adjusted under 35 U.S.C. 154(b) by 156 days.

(21) Appl. No.: 12/777,447

(22) Filed: May 11, 2010

(65) Prior Publication Data

US 2011/0279886 A1 Nov. 17, 2011

(51) Int. Cl.
*G02B 27/00* (2006.01)
*G02B 7/04* (2006.01)
*B23K 26/00* (2006.01)
*B23K 26/04* (2006.01)

(52) U.S. Cl. .............. 359/809; 219/121.62; 219/121.61; 250/201.5; 250/201.4

(58) Field of Classification Search .............. 219/121.6, 219/121.61, 121.62; 250/201.2, 201.4, 201.5; 359/809
See application file for complete search history.

(56) References Cited

U.S. PATENT DOCUMENTS

| 5,327,167 | A | 7/1994 | Pollard et al. |
| 6,137,580 | A * | 10/2000 | Gelbart .................. 356/401 |
| 6,937,959 | B2 * | 8/2005 | Keyl et al. ............... 702/159 |
| 2011/0278766 | A1 * | 11/2011 | Burkatovsky et al. ....... 264/400 |

FOREIGN PATENT DOCUMENTS

FR 2 820 681 A1 2/2001
WO WO 2009/115785 9/2009

* cited by examiner

*Primary Examiner* — David N Spector
(74) *Attorney, Agent, or Firm* — Nelson Adrian Blish

(57) ABSTRACT

An autofocus imaging apparatus (200) for three-dimensional imaging on a surface of a flexible media mounted on a cylindrical drum (104) includes a carriage (210) which moves parallel to a surface of the drum and an imaging stage (208) mounted on the carriage. The imaging stage includes a displacement sensor (112) for measuring a distance to the surface of the flexible media; imaging optics (216) for producing a three-dimensional image on the flexible media; and an autofocus drive (220) for changing a focus of the imaging optics. Encoders (256, 260) provide data on the drum and carriage position. A controller (116) receives and processes data from the displacement sensor and the encoders. A computer (236) receives data from the controller, processes controller data, and transmits instructions to the controller. The controller receives computer instructions and transmits focus commands to the autofocus drive or the imaging stage.

6 Claims, 7 Drawing Sheets

| | | | |
|---|---|---|---|
| X(1,1), Y(1,1), Z(1,1) | X(1,2), Y(1,2), Z(1,2) | ... | X(1,n), Y(1,n), Z(1,n) |
| X(2,1), Y(2,1), Z(2,1) | X(2,2), Y(2,2), Z(2,2) | ... | X(2,n), Y(2,n), Z(2,n) |
| ⋮ | ⋮ | ⋮ | ⋮ |
| X(m,1), Y(m,1), Z(m,1) | X(m,2), Y(m,2), Z(m,2) | ... | X(m,n), Y(m,n), Z(m,n) |

AUTOFOCUS IMAGING APPARATUS

CROSS REFERENCE TO RELATED APPLICATIONS

Reference is made to commonly-assigned copending U.S. patent application Ser. No. 12/777,463 (now U.S. Publication No. 2011/0278766), filed May 11, 2010, entitled THREE-DIMENSIONAL IMAGING OF FLEXOGRAPHIC MEDIA, by Vitaly Burkatovsky, the disclosure of which is incorporated herein.

FIELD OF THE INVENTION

The present invention relates to a method and apparatus for forming three-dimensional (3D) images on the surface of media cylindrical drum by laser ablation.

BACKGROUND OF THE INVENTION

Flexographic printing involves inking a raised image on a flexible media which then comes in contact with the print substrate, such as paper or plastic. The ink from the raised image onto the print substrate. The flexible plate is made of a rubbery material which has a somewhat pliant nature, the extent of which depends on the smoothness and fragility of the substrate. Contrary to other print processes such as offset lithography and gravure where high pressure is used during ink transfer, it is generally desirable to have a minimum of pressure between the raised inked image on the plate and the substrate. Too little pressure and no ink transfer or very uneven ink transfer will occur. Too much pressure and the pliant surface of the flexible plate will be squashed into the substrate blurring the image edges resulting in poor print quality.

Because of the requirement to work at minimal pressure for optimum quality, the distance between the plate surface and the substrate must be the same over the entire surface. While this depends on the uniformity of the press cylinder on which the plate is mounted, it also depends on the thickness uniformity of the flexible plate.

Methods for flexographic plate imaging by laser ablation with plates mounted on cylindrical drums is well known. The main application is in gravure and flexography printing industries where lasers are used to create ink carrying pits so the drums are able to transfer images directly or indirectly onto paper or polymer films. The techniques used are well developed and a wide range of lasers are used to create pits directly in metal drums or in drums coated with ceramic, rubber, or polymer layers. U.S. Pat. No. 5,327,167 (Pollard) describe a machine for ablating pits of variable density on the surface of a printing drum.

The lasers used are usually focused to spots on the drum surface with a diameter of 10 to 100 µm. Pits may be created by direct laser ablation or by ablation of a thin mask followed by chemical etching.

The drum or sleeve eccentricity as well as media thickness variations impact laser focusing and may lead to unacceptable defocusing. To eliminate this problem an autofocus system is required. The autofocus system described in WO 2009/115785 provides for measuring a distance to media just before imaging (engraving) and for subsequent corrections of the imaging lens position according to comparing of the resulted measurement with required focus distance.

FIG. 1 shows an example of an apparatus that can be used to ensure that the image created by the projection system remains in focus on the drum surface even if the drum varies in diameter, is not perfectly circular, or is mounted eccentrically on its axle. A cylindrical drum 104 is mounted on an axis about which it rotates. Cylindrical drum 104 is shown rotating in a clockwise direction 108. A laser beam 128, passes through lens 132 and creates an image on the surface of the cylindrical drum 104. Lens 132 and additional imaging optics components are attached to a carriage on a servo motor driven stage 124, to allow the optical components to move together along the Z direction 120 which is parallel to the projection system optical axis and perpendicular to the drum surface.

The stage that supports the carriage holding both the lens 132 mask is itself attached to second carriage. This second carriage is driven by a second servo motor driven stage which has a direction of motion parallel to the drum axis. This second stage, which is not shown in FIG. 1, has the function of moving the projection system and associated homogenizer along the length of the cylindrical drum 104. An optical sensor unit 112 is attached to the second carriage so that it moves down the length of the cylindrical drum 104 with the projection optics.

The sensor 112 is mounted such that it measures the relative distance from the sensor 112 to the drum surface at a position on the surface that is about to be exposed to laser pulses. The distance data generated by the sensor 112 is processed by controller 116 and used to drive the servo motor on the projection system stage in order to maintain the distance from the lens 136 to the drum surface at the process point constant so that the imaging is always in focus. For this application, the cylindrical drum 104 is expected to be made with some precision so that as it rotates and the optical projection system traverses the full length of the cylindrical drum 104, variations in the surface location and hence movement of the projection optics in the Z direction are expected to be small.

The system as described above is limited to only one layer engraving. This is due to the fact that after the first engraving layer is completed, it limits the performance of an autofocus system for engraving of subsequent layers, both from the point of view of distance to media sensing as well as from dynamics of lens movement.

A first of this invention is to provide an autofocus system which is capable of maintaining constant focus distance between the drum or sleeve media surface and imaging lens in one and more than one engraving cycles.

A computer that supports engraving by multiple laser channels may be heavily loaded due to the need to process 3D image engraving data. In this case, additional autofocus tasks may affect the functionality by lowering the calculation speed. Hence a second purpose of this invention is to reduce the load of the machine computer while 3D image engraving process is performed.

SUMMARY OF THE INVENTION

Briefly, according to one aspect of the present invention a method and an apparatus for three dimensional precision imaging on a surface of a flexible media is disclosed. The media is mounted on a cylindrical drum and imaged by laser ablation. An imaging stage is adapted to move on a carriage in perpendicular and parallel direction relative to the drum. The imaging stage includes a displacement sensor configured to measure the surface structure of the flexible media, and imaging optics configured to image on the flexible media. The imaging optics is adapted to move in perpendicular direction relative to the drum.

A controller receives measurements of the surface structure from the displacement sensor. The measurements represent a media surface map. The computer will process the measurements and creates a command array structure for each of the drum revolutions. The computer will then transmit a relevant command array structure to the controller during or prior to imaging. The imaging optics will image on the media by controlling the distance from the imaging optics to each imaging spot on the flexible media according to the relevant command array structure and read outs from the media position encoders.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 5 is an illustration of an array representing set focus commands;

DETAILED DESCRIPTION OF THE INVENTION

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

While the present invention is described in connection with one of the embodiments, it will be understood that it is not intended to limit the invention to this embodiment. On the contrary, it is intended to cover all alternatives, modifications and equivalents as covered by the appended claims.

Figure 1:
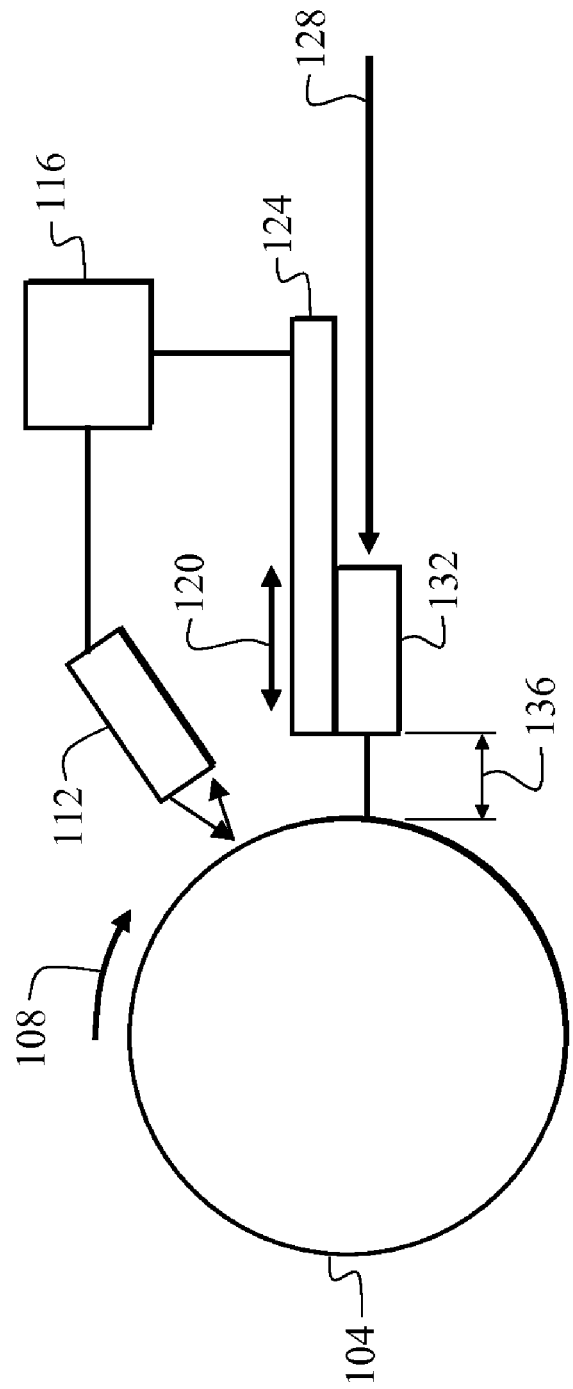
FIG. 1 is a schematic illustration of an autofocus prior art system.
Figure 2:
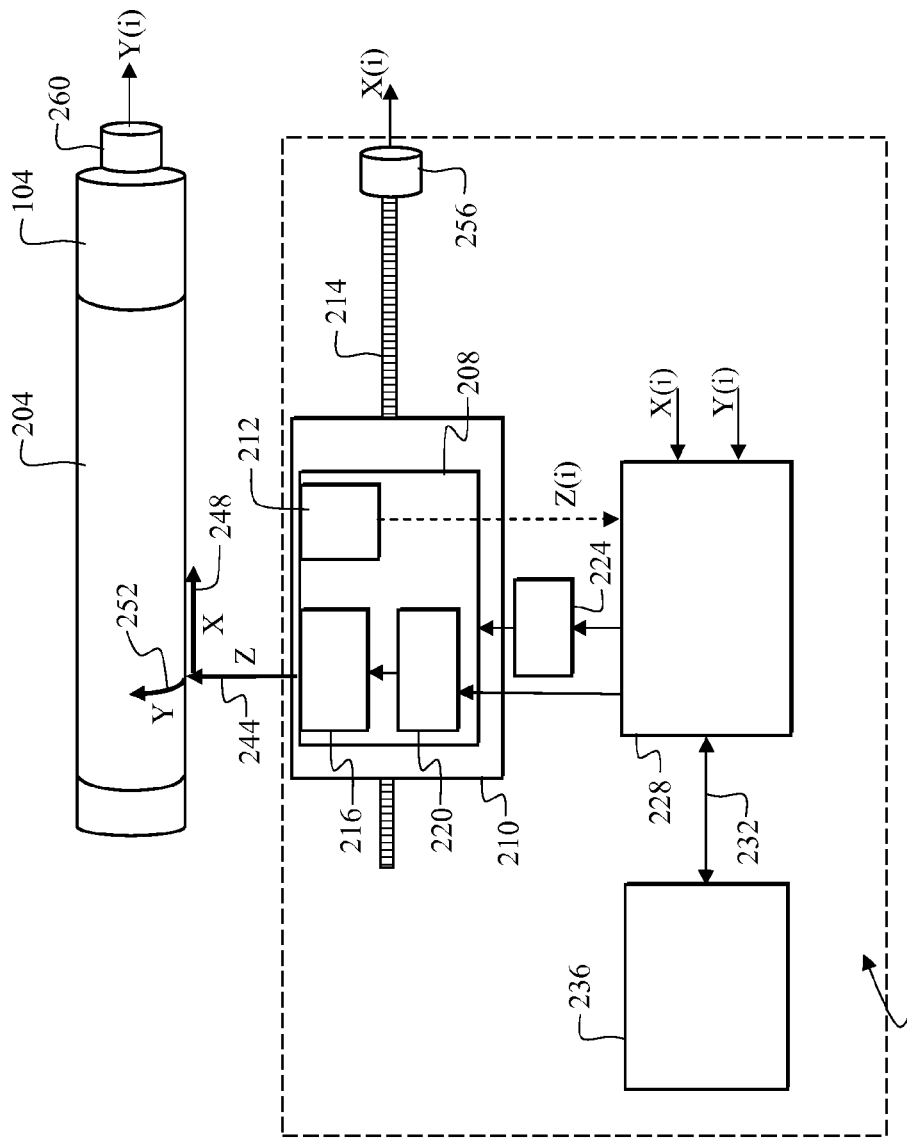
FIG. 2 is a schematic illustration the autofocus system of the present invention.

FIG. 2 shows an embodiment of the present invention. An autofocus system for direct engraving of printing plates is depicted. Autofocus system 200 is built into an imaging device (shown partially). The imaging device includes a rotating cylindrical drum 104 or a printing sleeve (not shown). A printing plate 204 is mounted on cylindrical drum 104.

An imaging stage 208 is placed on a carriage 210 coupled with screw 214 such that rotation of the screw driven by the carriage motor (not shown) forces carriage 210 to move in the horizontal (parallel to cylindrical drum 104 X-axis) X direction 248. The imaging stage 208 is capable to move in a perpendicular Z direction 244 towards cylindrical drum 104. The moving of imaging stage 208 in Z-direction is provided by the stage assembly drive 224. Imaging stage 208 carries an imaging optics assembly 216. The imaging optics assembly 216 is adapted to move relative to the imaging stage 208 in Z direction 244, driven by an autofocus drive 220. A displacement sensor 212 is positioned on imaging stage 208 to perform constant measurements of the distance to plate 204 in Z direction 244. The movements in X and Y directions are measured by encoders 256 and 260 respectively. An ability of cylindrical drum 104 rotation as well as carriage 210 moving in conjunction with X, Y, and Z directions measurements allows the plate/drum surface scan. The plate 204 surface scan results are arranged by controller 228 and are further communicated to machine computer 236 via data link 232.

Figure 3:
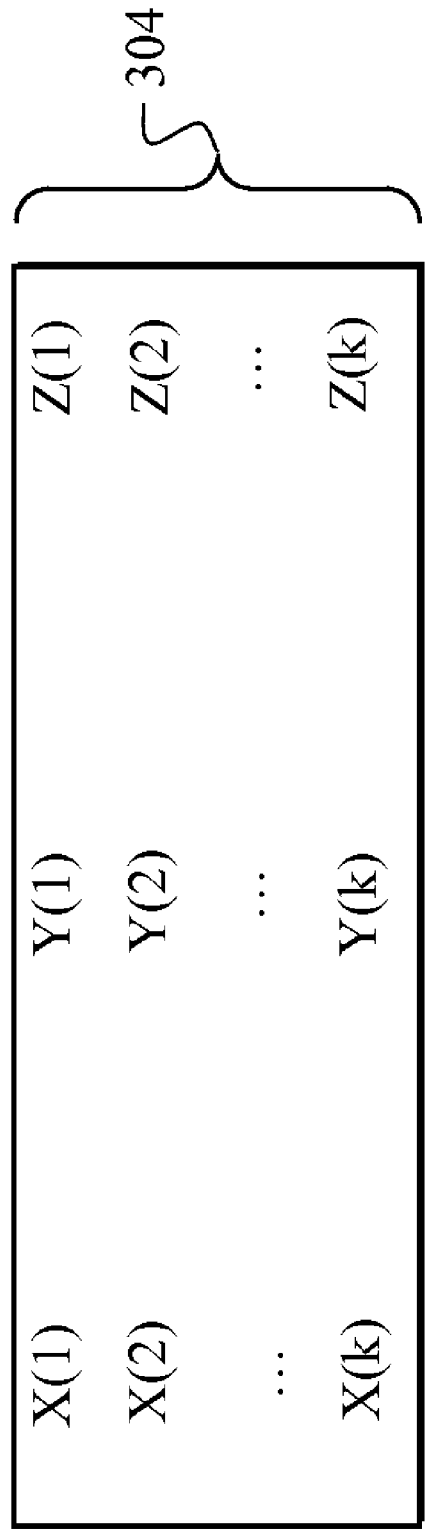
FIG. 3 is an illustration of an array representing plate surface measurement.

While at a standby phase, the imaging stage 208 is parked in home position, which is typically in front of the drum left or right side and the imaging optics assembly 216 is positioned in a predefined focus position relative to cylindrical drum 104. According to the start command of machine operator the computer 236 automatically controls the rotation of cylindrical drum 104 with plate 204 and movement of carriage 210 along cylindrical drum 104 from home position to the away position at the opposite to home position drum side. At the same time simultaneous capturing of X, Y, and Z measurements is performed by controller 228. Captured data is further communicated to machine computer 236 via data link 232. This take place up to the finish of scan happened for example at a moment when carriage reaches the away position. The measured data is transmitted to computer 236, data is archived in the memory of computer 236 as a mapped surface structure 304 (shown in FIG. 3). Index in parenthesis determines the measurements capture number and "k" is a maximum measurements capture number (last capture number) respectively. Processing the scanned data is performed by the computer only to generate a array of focus commands, each array is intended to be used for at least one drum revolution, and each array is different from the next one. The computer sends a new array of focus commands to the controller when it finds that the next revolution requires a different array of commands. The number of commands per each array are equal, and each array represents focus commands for a full drum revolution.

According to a predetermined algorithm, computer software creates and stores in computer memory the set command array. The explanation of the set command array creation may be simplified by graphical (FIG. 4) representation of calculated set commands on the cylindrical drum 104 surface (X-Y axis). Each calculated set command (set point) characterized by $X_i$, $Y_i$, and $Z_i$ values, where $X_i$ and $Y_i$ are the cylindrical drum 104 and carriage 210 position where the autofocus drive 220 should update the position of imaging optics assembly 216 according to the desired calculated value $Z_i$. It means that each set command may be shown graphically as a point on the drum surface shown in X-Y coordinates. For example, the first set command characterized by coordinates $X(1),Y(1)$, and $Z(1)$ is represented as point 404 having coordinates $X(1)$, $Y(1)$. The second set command characterized by coordinates $X(2),Y(2)$, and $Z(2)$ is represented as point 408 having coordinates $X(2),Y(2)$ and $Z(2)$. The other set commands, such as $X(k)$, $Y(k)$, and $Z(k)$ representing point 412, are represented respectively.

Figure 4:
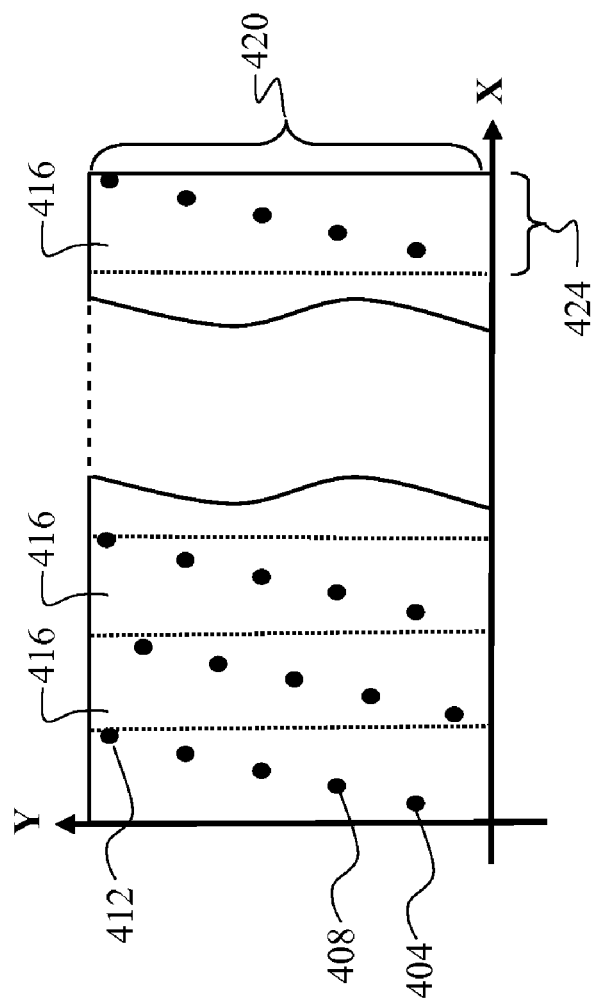
FIG. 4 illustrating graphical interpretation of set focus commands.

As it can be seen from FIG. 4 the drum surface is virtually divided by slices 416. Separation between the slices 416 is shown by the vertical dotted lines in FIG. 4. Each slice 416 is characterized by slice height 420 and slice width 424. Slice height 420 is equal to the drum circumference and slice width 424 is equal to the carriage 210 displacement for time of one cylindrical drum 104 revolution. In case wherein cylindrical drum 104 and carriage 210 speeds are constant, all slices 416 will be equal in size. In order to simplify the algorithm it is also assumed that each slice will have a constant number of set points. At the same time there is no need for the distance between the adjacent set points within the slices 416 to be constant.

Assuming "m" is a slice number and "n" is a number of set points per drum revolution the set command array structure 504 may be represented as shown on FIG. 5. In other words the set command array structure 504 consists of commands characterized by X, Y, and Z coordinates and created for correction of focus position errors of imaging optics 216 by controlled the autofocus drive 220. The goal of controller 228 in this case is to detect the appropriate time at which the autofocus drive 220 should be updated with a new command $Z_i$ for each upcoming set point, by comparing the actual and calculated ($X_i$ and $Y_i$) values.

Prior to the creation of set command array 504 the computer 236 software may additionally perform different tasks such as data filtering, resolution adjustment (sample resolution and set resolution may be different), compensations of control system components delays, and other. A set structure 504 may be communicated to controller 228 in different ways, for example by transmitting of whole command array structure 504 to controller 228 just after creation in the computer 236. In this case controller 228 should store this array and use it for autofocus drive 220 control as long as imaging is executed. This option calls for large memory and logic requirements in controller 228, but on the other hand such method reduces the load on computer 236, which will need to perform fast 3D image calculations during the engraving process.

Another embodiment that will help to reduce the logic and memory requirements of controller 228 as well as reducing the amount of transmitted data from computer 236 to controller 228 may be preferable. According to this embodiment, in processing the array 304 computer 236 will estimate the differences between the desired trajectories of imaging optics assembly 216 per each drum revolution. In the case where the difference is small (set commands per drum revolution are substantially similar) the computer 236 will not include the set command data for current revolution into the set command array 504 thus making the array 504 representing only different drum revolution control trajectories. In order to support focus control in a continuous manner, the controller 228 should be capable to reuse the set control data of previous revolution up to the moment of an updated drum revolution control data is received from computer 236. In this case controller 228 should finish the revolution with previous data and start with next (updated) drum revolution control data. It means also that at the moment of the updated revolution control data, transmission need to be in accordance with actual carriage position.

Figure 6:
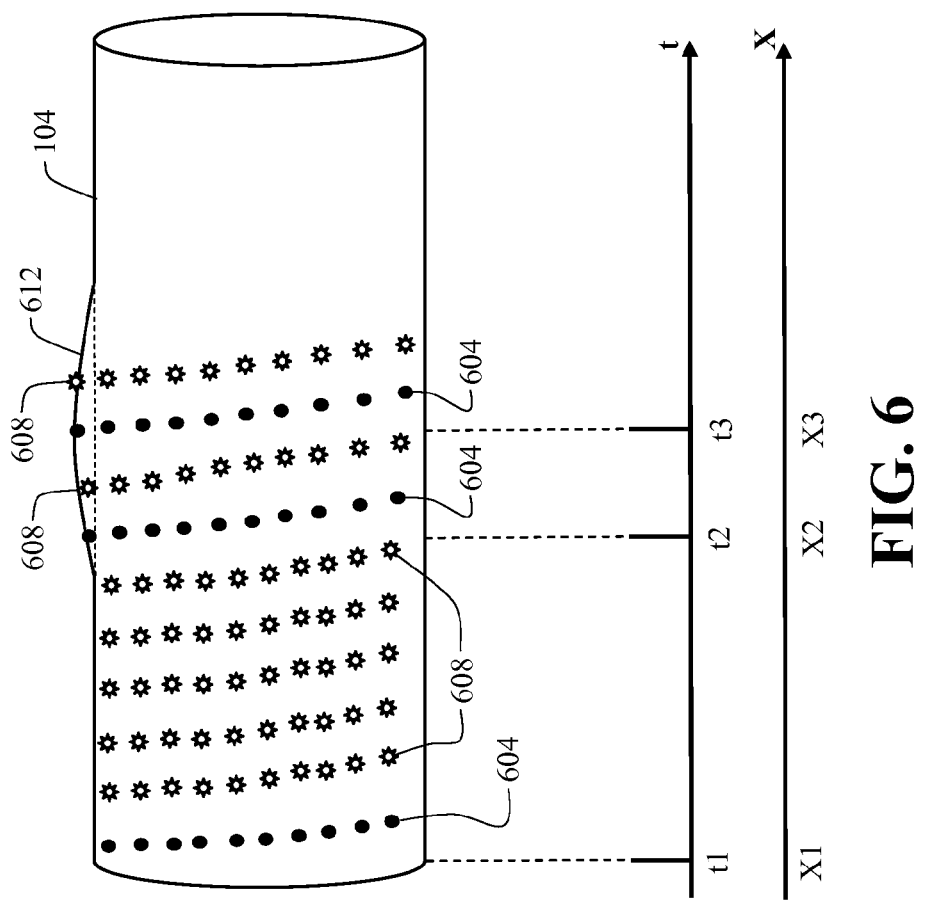
FIG. 6 illustrating a graphical representation of the command arrays structure representing each drum revolution.

For example, as depicted in FIG. 6, the moment of the first revolution control data transmission occurred at time t1 shown on the time t axis and around the initial carriage position shown as X1 on the X-axis. Immediately after receiving of this data, controller 228 will begin to send the set commands $Z_i$ to the autofocus drive 220 by comparing the actual Y position indicated by encoder 260 and the received $Y_i$ (received from structure 504) drum position. The set points 604 are representing points on the drum surface where for each $Y_i$ a focus correction command $Z_i$ is send to the autofocus drive 220, provided it is coordinated with the respective encoder position 260 actual readings.

In the case where there were no significant changes on the drum geometry the trajectory of imaging optics 216 for the next drum revolution should be similar to the previous one. Due to this similarity the next revolution set control data will not be included into the structure 504 and computer 236 will not send this data to the controller 228. In order to support an uninterruptable focus correction, the logic of controller 228 detects the end of revolution provided that no updated revolution data was send to the controller 228. In this case controller 228 logic starts the next revolution focus control referring to the previous revolution control data stored in the memory (not shown) of controller 228. Set points 608 indicate those points on the drum surface where $Y_i$ is equal to position encoder 260 read out and the respective focus correction command $Z_i$ is send to the autofocus drive 220. $Y_i$ is already resident in controller 228 memory.

Therefore at the end of each revolution controller 228 detects the next revolution data update. In the case where data was updated than controller 228 will use it for control, otherwise controller 228 will use the data stored in controller memory.

The first significant change in the desired imaging optics 216 trajectory caused by the drum geometry deviation should be around the carriage position depicted on X-axis as X2, showing plate surface deviation 612. Respectively the current revolution control data was included into the set command array structure 504 and transmission of this data will occur when computer 236 finds that actual carriage position is equal or close to X2. This moment is shown as t2. Behavior of controller 228 receiving the next revolution control data was described above. The same behavior will be at the moment t3 around carriage position X3.

Note that computer 236 to controller 228 communication method it is sufficient to send just the $Y_i$ information for each revolution set control data (without carriage position $X_i$). In this case carriage position is defined by computer 236 timing of relevant drum geometry change as is indicated by set command array structure 504. Imaging for engraving on plate 204 can be performed in more than one imaging cycle, thus in each cycle a layer of a pre-determined depth is engraved.

Figure 7:
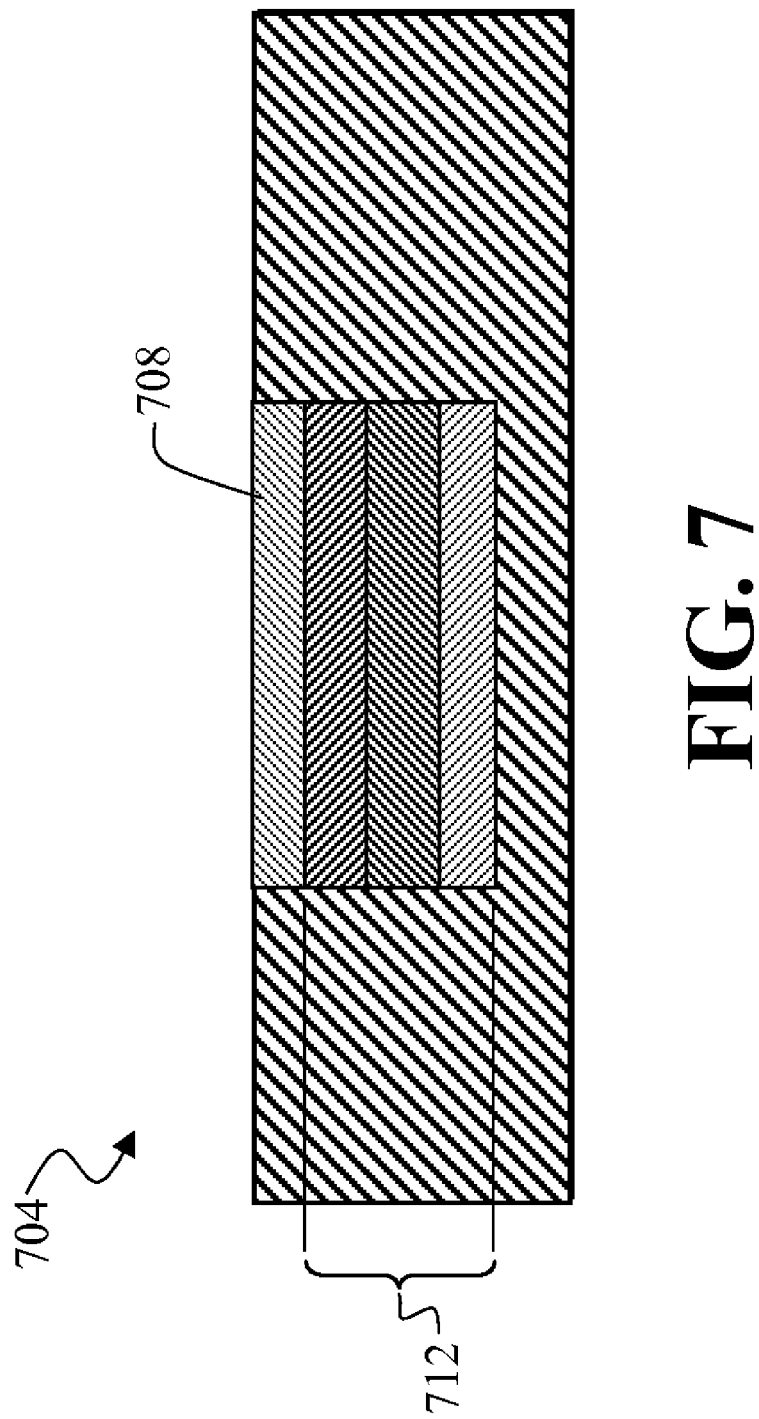
FIG. 7 illustrating a cross section of an engraved area on a plate created by plurality of imaged layers.

FIG. 7 shows an engraved area 704 on plate 204. In the first imaging cycle layer 708 is engraved. For each subsequent layer 712 the imaging stage 208 is advanced towards plate 204 in the distance equal to the engraving depth of previous layer. The imaging stage 208 is advanced by the stage drive assembly 224, coordinated by controller 228.

The invention has been described in detail with particular reference to certain preferred embodiments thereof, but it will be understood that variations and modifications can be effected within the scope of the invention.

PARTS LIST 104 cylindrical drum
108 drum direction
112 sensor
116 controller
120 moving direction of stage
124 driven stage
128 beam
132 lens
136 distance stage to drum
200 autofocus system for a direct engraving imaging system
204 plate
208 imaging stage
210 carriage
212 displacement sensor
214 screw
216 imaging optics assembly
220 autofocus drive
224 stage assembly drive
228 controller
232 data link between controller and computer
236 computer
244 Z direction 248 X direction
252 Y direction
256 X position encoder
260 Y position encoder
304 mapped surface structure
404 point in a set point
408 point in a set point
412 point in a set point
416 slices
420 slice height
424 slice width
504 set command array structure
604 sets of points transferred from computer to controller
608 sets of points restored from controller memory
612 plate surface deviation
704 engraved area
708 first imaged layer
712 subsequent imaged layers

The invention claimed is:

1. An autofocus imaging apparatus for three-dimensional imaging on a surface of a flexible media mounted on a cylindrical drum comprising:
- a carriage which moves parallel to a surface of said drum;
- an imaging stage mounted on said carriage;
- wherein said imaging stage comprises:
  - a displacement sensor for measuring a distance to the surface of said flexible media;
  - imaging optics for producing a three-dimensional image on said flexible media;
  - an autofocus drive for changing a focus of said imaging optics;
- encoders for providing data on said drum and carriage position;
- a controller which receives and processes data from said displacement sensor and said encoders;
- a computer which receives data from said controller, process said controller data, and transmits instructions to said controller; and
- wherein said controller receives computer instructions and transmits focus commands to said autofocus drive or said imaging stage.

2. The apparatus according to claim 1 wherein said imaging stage is moved toward or away from said drum according to focus commands.

3. The apparatus according to claim 1 wherein said autofocus drive refocuses said imaging optic according to said focus commands.

4. The apparatus according to claim 1 wherein said displacement sensor gathers data from the entire surface of the flexible media prior to writing an image on the media.

5. The apparatus according to claim 1 wherein said focus commands are sent from said computer when stored focus commands in said controller are substantially different from said focus commands to be processed in the next drum revolution.

6. The apparatus according to claim 1 wherein said displacement sensor data and said encoder data is collected concurrently with writing an image.

* * * * *